(12) United States Patent
Beale (10) Patent No.: US 8,694,973 B2
(45) Date of Patent: Apr. 8, 2014

(54) ABSTRACTING COMPUTATIONAL INSTRUCTIONS TO IMPROVE PERFORMANCE

(75) Inventor: Andrew Ward Beale, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 109 days.

(21) Appl. No.: 13/246,273

(22) Filed: Sep. 27, 2011

(65) Prior Publication Data

US 2013/0080744 A1 Mar. 28, 2013

(51) Int. Cl.
G06F 15/76 (2006.01)
G06F 7/38 (2006.01)
G06F 9/44 (2006.01)
G06F 9/00 (2006.01)
H03M 13/00 (2006.01)
G06F 9/45 (2006.01)
G06F 9/46 (2006.01)

(52) U.S. Cl.
USPC ........... 717/138; 712/229; 712/233; 712/239; 712/240; 712/43; 714/780; 717/136; 717/139; 717/146; 717/159; 718/100

(58) Field of Classification Search
CPC ... G06F 9/3806; G06F 9/3844; G06F 9/3804; G06F 9/30058; G06F 9/30174; G06F 9/3848; G06F 9/3889; G06F 9/45554; G06F 9/30189; G06F 9/45533; G06F 11/3648; G06F 8/4441
See application file for complete search history.

(56) References Cited

U.S. PATENT DOCUMENTS 5,339,238 A * 8/1994 Benson .......................... 717/159
6,738,967 B1 * 5/2004 Radigan ........................ 717/146

(Continued)

OTHER PUBLICATIONS

Koen Langendoen et al.,GCG: a Code Generator for Lazy Functional Langiages, 1992, [Retrieved on Nov. 15, 2013]. Retrieved from the internet: <URL: http://download.springer.com/static/pdf/711/chp%253A10.1007%252F3-540-55984-1_26.pdf?auth66=1384733005_be21fcf1319a1381ec9476d133f98462&ext.pdf> 19 Pages (278-292).*

(Continued)

Primary Examiner — Don Wong
Assistant Examiner — Anibal Rivera
(74) Attorney, Agent, or Firm — James E. Goepel (57) ABSTRACT

Methods and systems for executing a code stream of non-native binary code on a computing system are disclosed. One method includes parsing the code stream to detect a plurality of elements including one or more branch destinations, and traversing the code stream to detect a plurality of non-native operators. The method also includes executing a pattern matching algorithm against the plurality of non-native operators to find combinations of two or more non-native operators that do not span across a detected branch destination and that correspond to one or more target operators executable by the computing system. The method further includes generating a second code stream executable on the computing system including the one or more target operators.

20 Claims, 6 Drawing Sheets

(56) References Cited

U.S. PATENT DOCUMENTS

| | | | |
|---|---|---|---|
| 7,085,920 B2* | 8/2006 | Yoshimi | 712/239 |
| 8,074,055 B1* | 12/2011 | Yates et al. | 712/43 |
| 2002/0199091 A1* | 12/2002 | Tago et al. | 712/240 |
| 2003/0106011 A1* | 6/2003 | Miyauchi et al. | 714/780 |
| 2004/0250053 A1* | 12/2004 | McGrath et al. | 712/229 |
| 2005/0086650 A1* | 4/2005 | Yates et al. | 717/139 |
| 2007/0079296 A1* | 4/2007 | Li et al. | 717/136 |
| 2008/0216073 A1* | 9/2008 | Yates et al. | 718/100 |
| 2009/0254740 A1* | 10/2009 | Endo et al. | 712/233 |

OTHER PUBLICATIONS

Brian Alliet et al., Complete Translation of Unsafe native Code to Safe Vytecode, 2004, [Retrieved on Nov. 15, 2013]. Retrieved from the internet: <URL: http://dl.acm.org/citation.cfm?id=1059589> 10 Pages (32-41).*

* cited by examiner

| Parser Table | 510 |
|---|---|
| Operator 1; Operator 2<br>Operator 1; Operator 2; Operator 3<br>... | NativeOp1<br>NativeOp2, NativeOp3<br>... |

*FIGURE 6*

ABSTRACTING COMPUTATIONAL INSTRUCTIONS TO IMPROVE PERFORMANCE

TECHNICAL FIELD

The present disclosure relates generally to computational performance, and in particular at an instruction set level. In particular, the present disclosure relates to abstracting computational instructions to improve performance of a computing system.

BACKGROUND

A computing system generally includes a central processing unit that is configured to execute program instructions which are ordered and arranged to execute various tasks. Each central processing unit has a predefined set of instructions capable of execution on that system, referred to as an instruction set. The instruction set executable by a central processing unit defines the instruction set architecture of that central processing unit.

Often, it is desirable to run software written for a particular instruction set architecture on a computing system that has a different, and incompatible, instruction set architecture. To do so, the software must be translated from the instruction set in which it is written to an instruction set compatible with the target central processing unit. This can be done at least two different ways. First, if source code is available, it can be recompiled onto the new instruction set architecture using a compiler specific to that architecture. Second, if source code is not available or if for some other reason the binary program is the desired source from which operation is to be derived, the software can be translated onto the new instruction set architecture by translating the binary program onto the new instruction set architecture on an instruction-by-instruction basis.

In comparing these two approaches, it is noted that use of source code can render a much more efficient translation to the new instruction set architecture, because efficiencies in a particular instruction set can be exploited based on the structure of the overall software. However, a recompiled source code translation cannot be used in realtime, and cannot be used if source code is unavailable. In contrast, the binary translation arrangement is generally resource intensive and does not result in execution of the most efficient translation possible. This is because each binary instruction in one language is generally translated into a binary instruction in the target language, and designed for the target architecture. That binary instruction may be a different number of bits, bytes, or words long, or the particular byte and/or word length may differ across the architectures. Furthermore, the binary instruction may be byte-ordered differently in the source and target architectures, for example being big-endian or little-endian.

To accomplish execution of binary code on a non-native instruction set architecture, the binary code is often translated using an emulator designed for a target instruction set architecture. An emulator is a set of software modules that is configured to execute binary code from its native format in a way that is recognizable on a target computing system executing the target instruction set architecture. This code, referred to as emulation mode code, is parsed by the emulator to detect operators and other information that are then translated to be executed in a manner recognizable on the target computing system. For example, if a target system operates using an eight byte code word and an original native system uses a six byte code word, the emulator would look at a current and next eight byte code word in realtime, to detect one or more operators of six-byte length (e.g., in case they overlap across the eight-byte codeword); the emulator would then determine corresponding instructions in the target instruction set architecture that would accomplish the same functionality as the native instruction, and execute that instruction. This code execution allows for realtime translation and execution on an operator-by-operator basis, but is inefficient, in that it may not take into account the available operators in the target system that could more efficiently execute the code when it is translated.

For these and other reasons, improvements are desirable.

SUMMARY

In accordance with the following disclosure, the above and other issues are addressed by the following:

In a first aspect, a method for executing a code stream of non-native binary code on a computing system is disclosed. The method includes parsing the code stream to detect a plurality of elements including one or more branch destinations, and traversing the code stream to detect a plurality of non-native operators. The method also includes executing a pattern matching algorithm against the plurality of non-native operators to find combinations of two or more non-native operators that do not span across a detected branch destination and that correspond to one or more target operators executable by the computing system. The method further includes generating a second code stream executable on the computing system including the one or more target operators.

In a second aspect, a computing system is disclosed that includes a memory and a processing unit operatively connected to the memory unit and configured to execute program instructions defined by a first instruction set architecture. The computing system further includes an emulation module stored in the memory and executable on the processing unit, the emulation module including instructions for executing a code stream on the processing unit. The code stream is defined by a second instruction set architecture incompatible with the first instruction set architecture. The emulation module includes a parser module and a pattern matching module. The parser module is configured to parse the code stream to detect a plurality of elements including one or more branch destinations and a plurality of non-native operators. The pattern matching module is configured to find combinations of two or more non-native operators that do not span across a detected branch destination and that correspond to one or more target operators executable by the computing system. The emulation module is configured to generate a second code stream executable on the computing system including the one or more target operators.

In a third aspect, a computer-readable storage medium is disclosed that includes computer-executable instructions stored thereon which, when executed on a computing system, cause the computing system to execute a method of executing a code stream of non-native binary code. The method includes parsing the code stream to detect a plurality of elements including one or more branch destinations and a plurality of non-native operators, and generating a plurality of arrays of information describing the code stream, the plurality of arrays including a map array, an operator array, and an operator metadata array. The method further includes executing a pattern matching algorithm against the plurality of non-native operators to find combinations of two or more contiguous non-native operators that do not span across a detected branch destination in the code stream and that correspond in a parser table to one or more target operators executable by the computing system. The method also includes generating a second code stream executable on the computing system including the one or more target operators.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for executing a code stream of non-native binary code on a computing system. By non-native, it is intended that a binary code stream received by a computing system cannot be executed directly on a computing system without some type of translation, for example within an emulator or other pre-execution translation system. In general, the systems and methods of the present disclosure provide increased efficiency in executing emulated code streams by translating non-native code streams using efficient groups of native operators as a replacement for a predetermined sequence of non-native operators, rather than strictly on an operator-by-operator basis. As such combinations are discovered or provided by the target instruction set architecture, additional efficiencies can readily by realized within emulated code streams.

Figure 1:
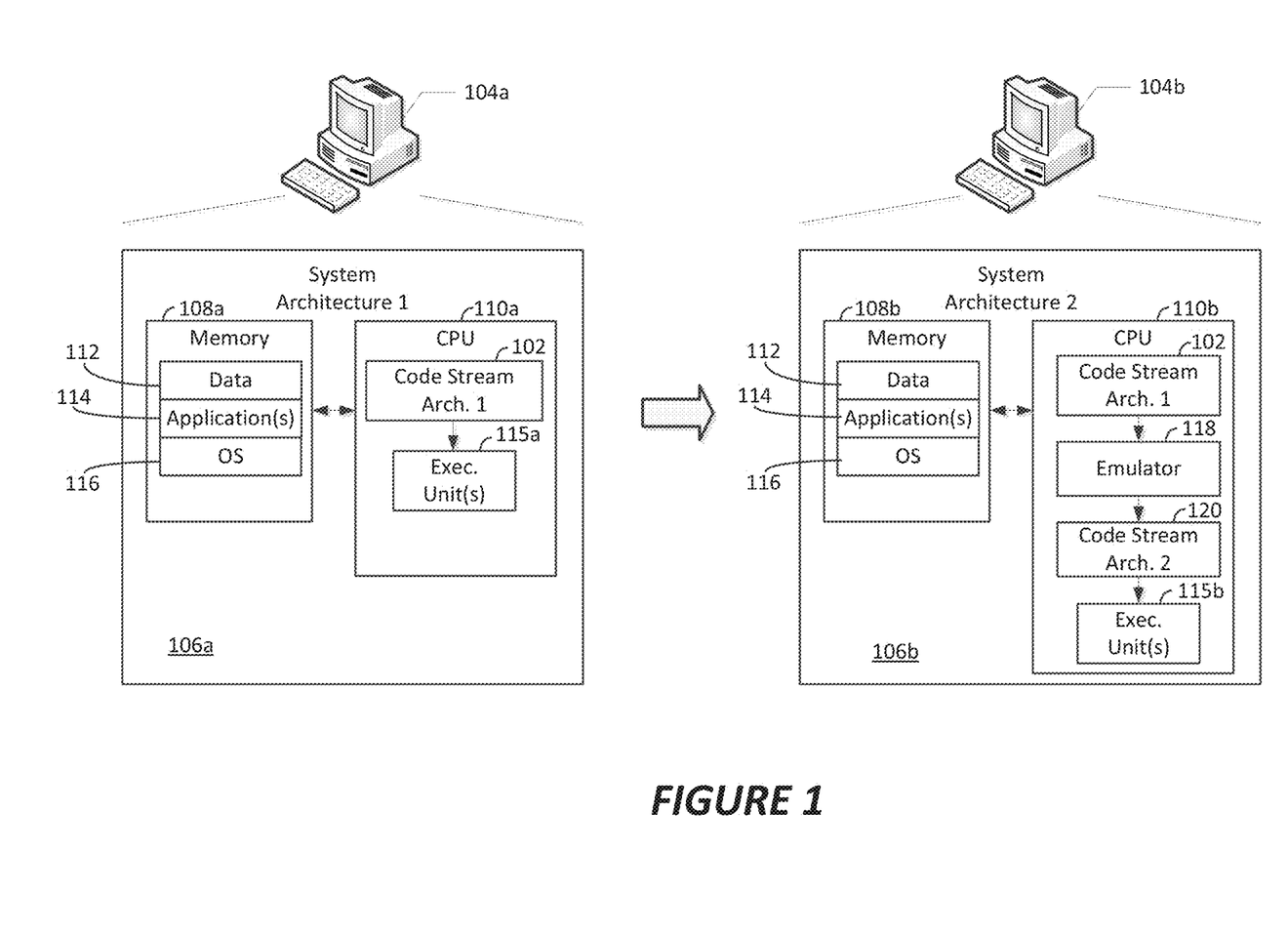
FIG. 1 is a schematic illustration of a plurality of computing systems operating using incompatible instruction set architectures.

Referring now to FIG. 1, a schematic illustration of a plurality of computing systems operating using incompatible instruction set architectures is shown. The illustration shown in FIG. 1 is intended to illustrate execution of a code stream 102 on two computing systems 104a-b using different and incompatible instruction set architectures. In other words, while code stream 102 executes natively on the hardware provided as part of computing system 104a, it is non-native to the computing system 104b, meaning that computing system operates using a different set of instructions, and cannot natively execute those instructions, or operators, included in the code stream.

In further specific detail regarding this distinction between native and non-native execution of a code stream, computing system 104a has a first system architecture 106a, and computing system 104b has a second system architecture 106b. Computing system 104a includes a memory 108a and processing unit 110a, while computing system 104b has a memory 108b and processing unit 110b. Typically, in systems having a different system architecture, different memory address sizes and different instruction lengths may be employed, as well as different sets of registers or other resources within the processing units 110a-b.

In the example shown, each memory 108 includes a variety of different types of stored information, including data 112, applications 114, and an operating system 116. On computing system 104a, the operating system executes natively using the system architecture 106a, and controls operation of the applications 114 and access to data 112. The resulting code stream 102 represents a sequence of binary operations and data that are parsed and executed on the computing system 104a, within one or more execution units 115a of the processing unit 110a.

In contrast, the same data 112, applications 114, and operating system 116 can be stored in memory 108b and can form code stream 102, but that code stream cannot directly be executed by the processing unit 110b. Rather, the code stream 102 is passed to an emulator 118, which converts the code stream 102, which is non-native with respect to system architecture 106b, to a second code stream 120 which is native to that system architecture. That second code stream 120 can then be executed on execution units 115b of the processing unit 110b.

Figure 2:
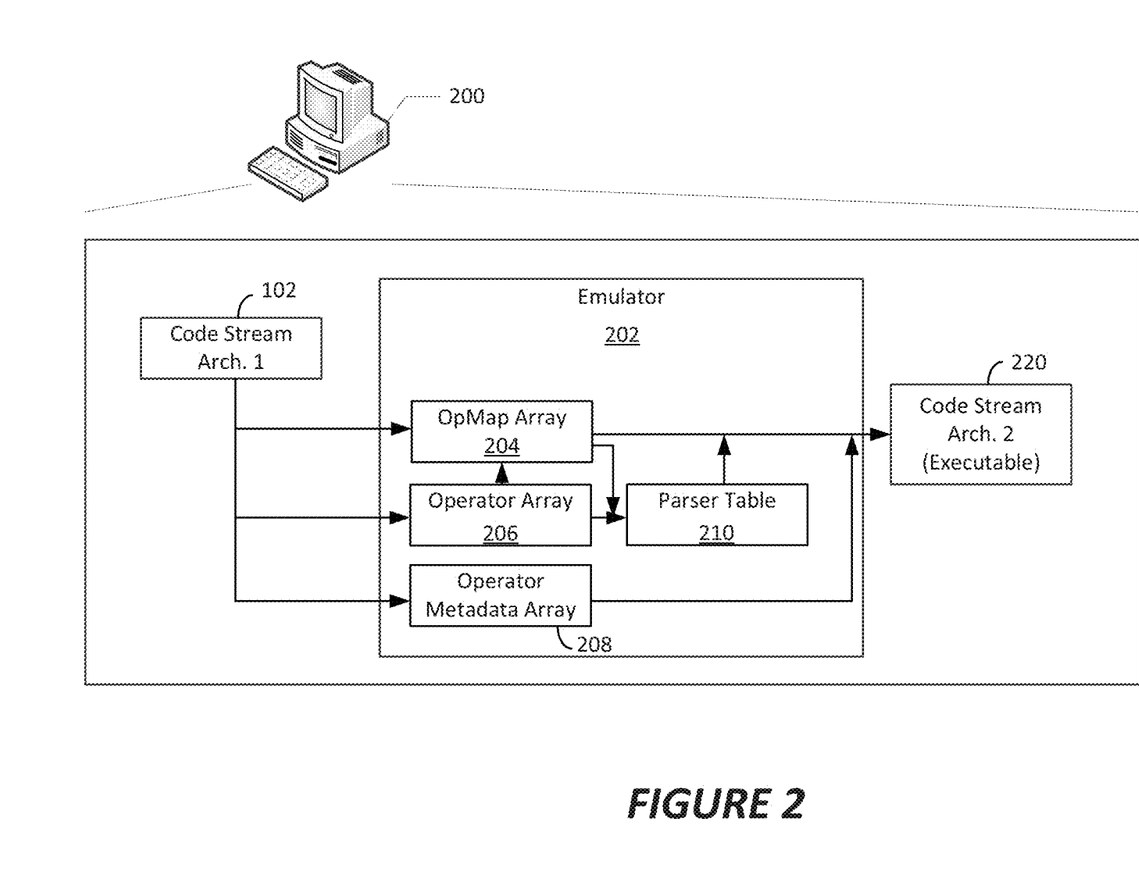
FIG. 2 is a schematic illustration of a target computing system executing emulated code derived from a non-native code stream, according to a possible embodiment of the present disclosure.

Referring now to FIG. 2, an example computing system 200 is disclosed which can be configured to execute non-native code streams, for example emulated code as processed by emulator software. The computing system 200 can in some embodiment represent computing system 104b, reflecting the fact that at one time the non-native code stream received at the computing system 200 was written for an instruction set architecture supported by a different hardware system.

The computing system 200 is configured to receive a code stream 102 in memory, and execute that code stream using an emulator 202. As discussed above, the code stream 102 is a non-native code stream, meaning that it is written for execution on an instruction set architecture that is incompatible with the instruction set architecture of the computing system 200. In some embodiments of the present disclosure, the computing system 200 operates using an Intel-based instruction set architecture (e.g., IA32, IA32-x64, IA64, etc.), while the code stream 102 can be written for any of a number of other types of instruction set architectures, such as PowerPC, ARM, MIPS, SPARC, or other similarly incompatible system architectures. The emulator can take a number of forms, but is typically arranged to parse through the code stream one or more times to decompose the code stream into elements describing its contents to provide efficient executable code using the instruction set architecture of the computing system 200.

The emulator 202 is analogous to emulator 118 of FIG. 1, and is configured to decompose the code stream 102 into its constituent operators and parameters for analysis and translation. In the embodiment shown, the emulator 202 decomposes the code stream 102 into an operator map array 204, an operator array 206, and an operator metadata array 208. In general the emulator 202 separates operators (i.e. instructions) from other data describing those operators, such as the parameters used by those operators. By isolating the operators from this "Metadata" and mapping the locations of operators to isolate contiguous operators (i.e., operators not separated by branches or ends of operator blocks), the tasks performed by two or more non-native operators can be accomplished by an analogous one or more native operators, rather than performing a strictly operator-by-operator translation.

Additional example details of the contents of the arrays 204-208 are described in further detail below in connection with FIGS. 5-6, below. Additionally, other arrays, tables, or other types of data structures could be used as well, in alternative embodiments.

In the embodiment shown, a parser table 210 receives the contents of the operator map array 204 and operator array 206 to (1) locate contiguous operators in the code stream 102, and (2) find a matching set of operators in the target instruction set architecture that perform the same tasks as those non-native operators. A target code stream 220 can then be generated based on the output of that parser table, as well as "left over" operators in the non-native code stream that are then translated on an operator-by-operator basis, as recombined with the parameter information from the operator metadata array 208. This resulting target code stream can then be executed natively on the computing system 200 (e.g., within execution units, such as described above in conjunction with FIG. 1, or below in conjunction with FIG. 3).

Figure 3:
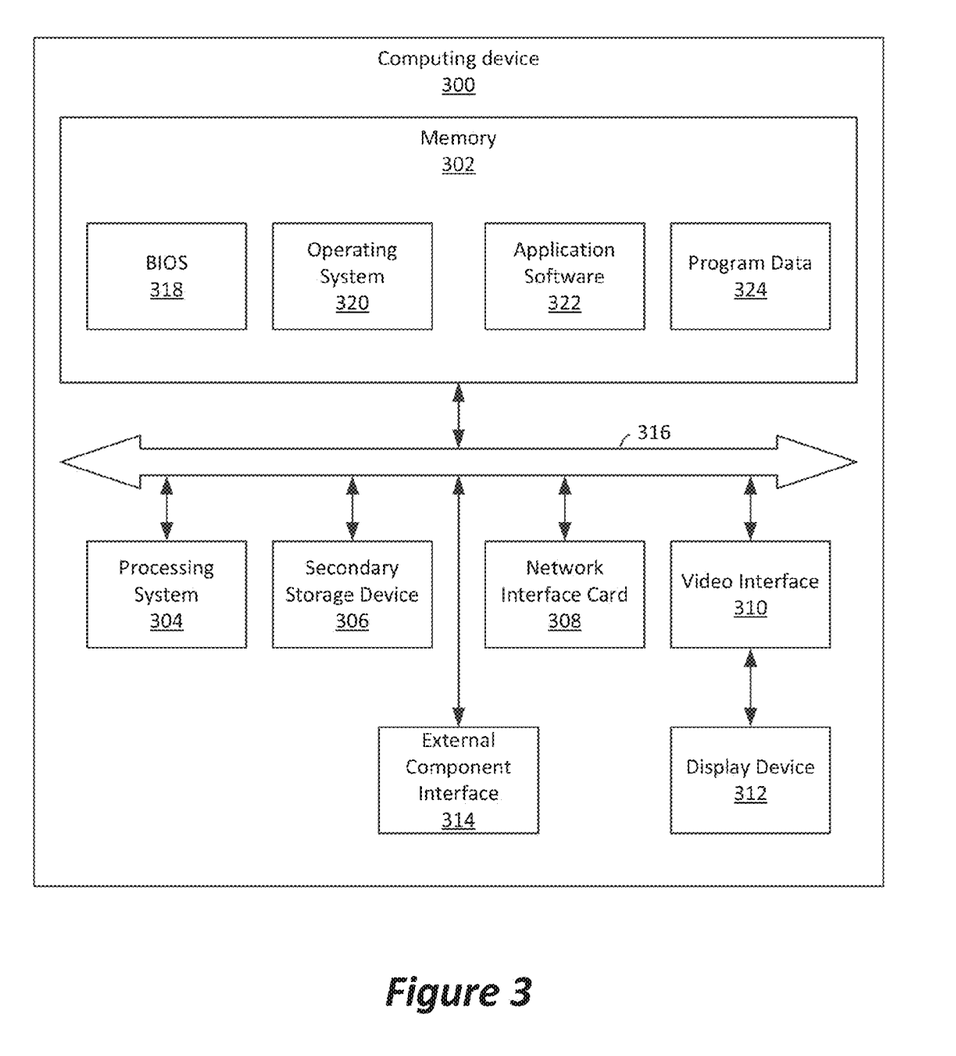
FIG. 3 is a schematic illustration of an example computing system in which aspects of the present disclosure can be implemented.

FIG. 3 is a block diagram illustrating an example computing device 300, which can be used to implement aspects of the present disclosure. In various embodiments, the computing device 300 implements one particular instruction set architecture, and can be used to execute emulation software and/or translate non-native code streams for execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as a cathode-ray tube display, an LCD display panel, a plasma screen display panel, a touch-sensitive display panel, an LED screen, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communications medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300.

Although particular features are discussed herein as included within an electronic computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 4:
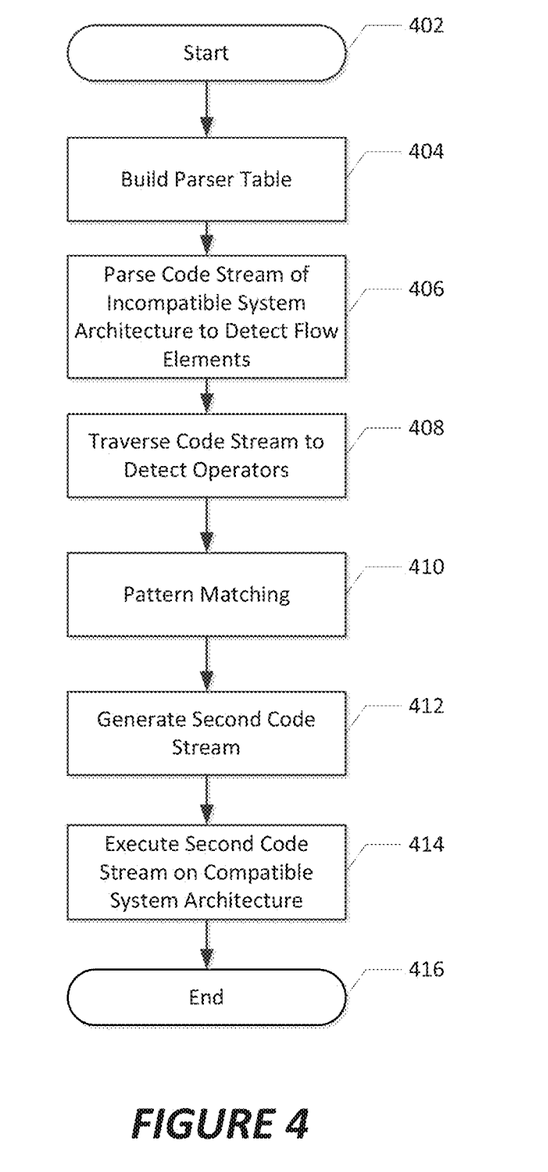
FIG. 4 is a flowchart of methods and systems for executing a code stream of non-native binary code, according to a possible embodiment of the present disclosure.

Referring now to FIG. 4, a flowchart of methods and systems 400 is shown for executing a code stream of non-native binary code, according to a possible embodiment of the present disclosure. The methods and system 400 can be implemented as one or more software modules within an emulator or other equivalent native software application or native operating system. In the embodiment shown, the methods and system 400 represent a multi-pass arrangement in which an original, non-native code stream (e.g. code stream 102, 202 above) is translated for execution on a computing system such as those illustrated in FIGS. 1-3, above. In the embodiment shown, the methods and systems are instantiated at a start operation 402, which corresponds to initialization of a target computing system and associated emulation software for executing a non-native code stream.

A parser table operation 404 initializes a parser table, loading one or more sets of information into that parser table. The information can be, for example stored at the computing system or loaded by the emulator. The information generally correlates two or more non-native operators to one or more native operators that perform equivalent functionality, allowing those two non-native operators to be efficiently replaced by native operators on something other than a one-to-one, operator-to-operator basis.

A parsing operation 406 parses through a non-native code stream to detect one or more elements within that code stream. The elements within the code stream can be, in some embodiments, simply be identifiers of the types of operators that are present within the code stream and their positions. For example, the elements identified can include branches and branch targets, or other end of block operators that would change control flow within a code stream. In some other embodiments, additional information could be captured, such as the identity of each operator and parameter within the code stream. This information can be, in some embodiments populated into one or more data structures managed by the emulator, such as the operator map array 204, operator array 206, and operator metadata array 208 of FIG. 2.

A traversal operation 408 traverses the parsed code stream (e.g., the code stream itself or the arrays 204-208 generated from the code stream) to detect the specific non-native operators in the code stream, for example to find equivalent combinations of one or more operators executable in a target instruction set architecture that can be used to perform an equivalent function. The traversal operation 408 can optionally be used when the first parsing operation 406 does not fully capture each of the operators and/or parameters included in the non-native code stream. At a minimum, a complete description of the type of data and position of data for each item in the non-native code stream is captured in the operator map array 204 for convenient reference to at least (1) the operator map array and (2) the code stream itself to determine patterns to be matched.

A pattern matching operation 410 locates groups of contiguous operators within the code stream, and compares a pattern of contiguous operators against a parser table to determine a possible replacement combination of operators in the native, target instruction set architecture that perform an equivalent task. The pattern matching operation 410 can take a variety of forms. In one embodiment, the pattern matching operation 410 executes in conjunction with the second parsing operation 408, while in other embodiments, it executes after the first (non-native) code stream has been fully parsed.

In some embodiments, the pattern matching operation 410 prioritizes locating a maximum number of non-native contiguous operators for replacement, while in other embodiments, the pattern-matching operation 410 prioritizes locating patterns where there is a greatest performance enhancement (e.g., defined by a weighting operation based on prior experience with testing conversions between the non-native and target instruction set architectures). Other arrangements are possible as well, such as minimizing the number of target instructions used in replacement, or employing a best-fit match to minimize the number of unmatched operators.

In certain embodiments, each entry in the parser table that is loaded on the target computing system has an associated handler function that can be called upon locating a matching parser table entry. The handler function can, in such embodiments, be configured to emit code executable on the target instruction set architecture to perform an equivalent function to that defined by the matched, non-native operators.

A code stream generation operation 412 generates a code stream of operators combined with parameters configured for execution on a target instruction set architecture. In accordance with the present disclosure, the code stream generation operation 412 generates a code stream executable on the computing system on which the emulator executes, and does so by substituting two or more non-native operators for one or more operators defined by the target instruction set architecture, for example as defined within a parser table and emitted from a handler function. The code stream generation operation 412 also combines those operators selected for execution on the target instruction set architecture with related parameters (e.g., from an operator metadata array).

Additionally, the code stream generation operation 412 will interleave translations for "unmatched" operators into the code stream as necessary by performing an operator-by-operator translation. In the context of the present disclosure, an "unmatched" operator refers to a non-native operator that is not part of a set of two or more operators for which a match is found in the parser table. These unmatched operators are translated singly and recombined with parameters (e.g., using the offset of the operator within the code stream and defined parameters associated with the unmatched operator).

In some embodiments, the pattern matching operation 410 is capable of being disabled by a user, such that the code stream generation operation 412 executes only using operator-by-operator translation, and the emulator software does not attempt to find concatenated operators. In such embodiments, a resulting code stream generated by an emulator will generally lack the efficient multi-operator replacements provided by the defined entries in the parser table, and will generally result in degraded performance. To allow a user to tune the level of performance relative to the computational intensity of the code stream translation performed by the pattern matching operation, in still other embodiments the user may be permitted to define a level of pattern matching to be performed, for example a maximum number of non-native operators in any matched pattern in the parser table. This allows the user of the emulator to adjust the computational intensity and memory requirements of the pattern-matching operation 410.

In still further embodiments, multiple different parser tables could be used, with user options allowing selection of a particular parser table by the pattern matching operation 410. In such embodiments, an instruction could be called by an emulator (e.g., automatically or in response to user input) to generate a target code stream based on the selected parser table. This would allow, for example, use of different levels of computational complexity by an emulator, by including different combinations or subsets of translations in a particular parser table. In alternative embodiments, different sets of characteristics in a particular parser table, or portions of a particular parser table, could be selected for inclusion and use by the pattern matching operation 410. Other alternative arrangements for adjusting computational intensity to generate a target code stream could be used as well.

Regardless of the various methods for selecting different parser tables or portions of parser tables in each of the above-described embodiments, different target code streams may be generated based on the selected parser table or table subset. This is because different translations between the non-native instruction set architecture and the target instruction set architecture could result in a different target code stream.

An execution operation 414 corresponds to execution of the code stream that is created specifically for the target computing system. Generally, the execution operation 414 corresponds to execution of native code on the target computing system.

In some embodiments, the execution operation 414 can occur at least partially concurrently with the code stream generation operation 412, and optionally also concurrently with the pattern matching operation 410 and optional second parsing operation 408. In such embodiments, as the second parsing pass is performed by the traversal operation 408, the pattern matching operation 410 and code stream generation operation 412 can work to generate the target code stream, which, once generated, can immediately be provided to one or more execution units of the target computing system for use. In alternative embodiments, the execution operation 414 is performed after completion of the code stream generation operation 412, to ensure that the code stream at each possible branch target has been generated.

The methods and systems 400 terminate at an end operation 416, which corresponds to completed execution of the emulated, non-native code stream.

Figure 5:
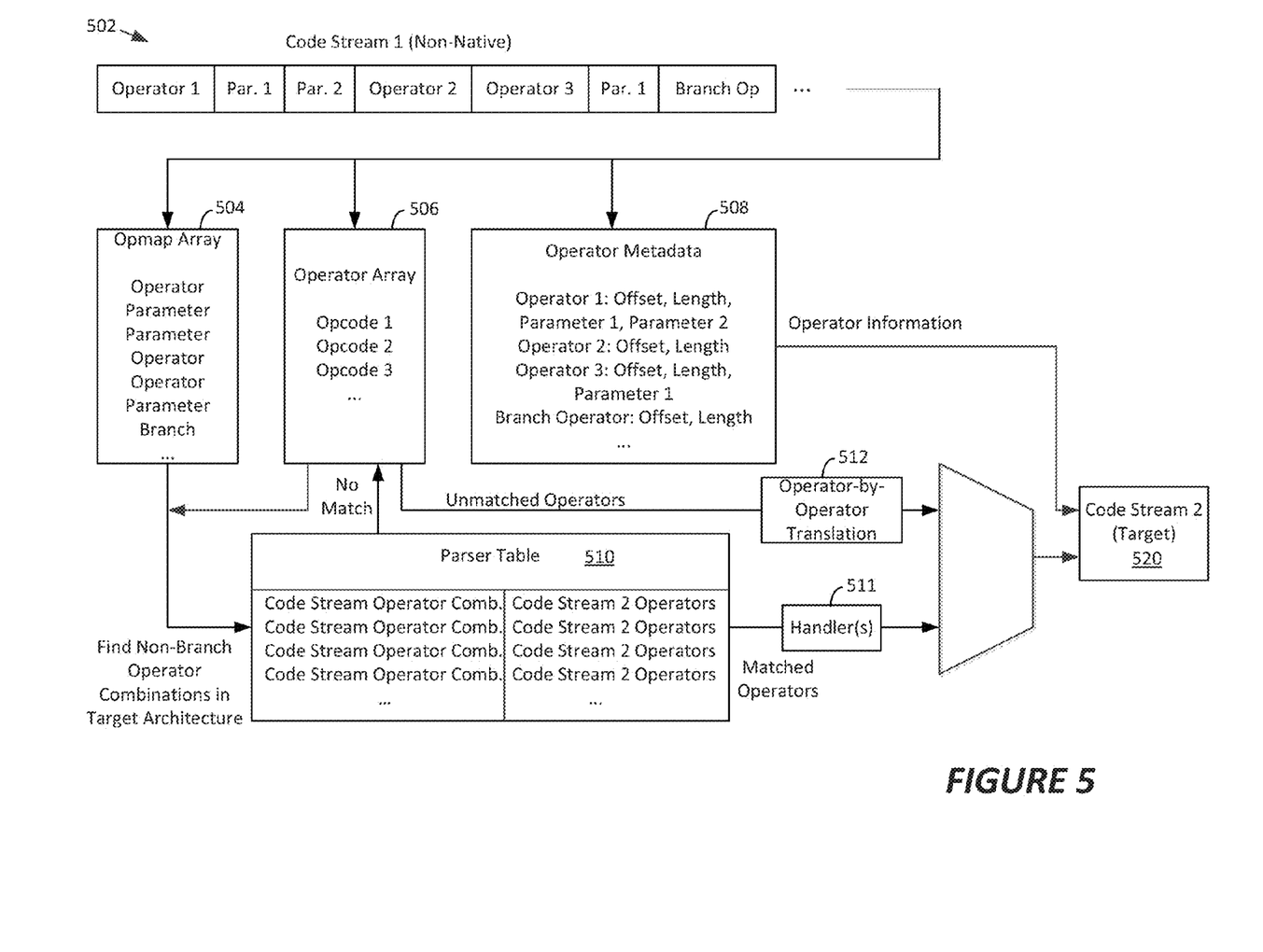
FIG. 5 is a logical block diagram illustrating emulation of a code stream adapted to a first instruction set architecture on a computing system executing a second instruction set architecture.

Referring now to FIG. 5, a logical block diagram illustrating emulation of a code stream adapted to a first instruction set architecture on a computing system executing a second instruction set architecture is shown. In the embodiment shown, a code stream 502 is passed to an emulator or otherwise prepared for execution as emulation mode code in a computing system to which that code stream is non-native (i.e., does not execute natively on that computing system's instruction set architecture). The code stream 502 generally can correspond to code stream 102 of FIGS. 1-2, and is parsed to generate code stream 520, which is a code stream executable on the computing system to which the emulator is directed (i.e., a native code stream for a particular computing system operating with a particular instruction set architecture).

The code stream 502 is parsed by emulator software, and data is placed into a number of data structures, depending upon the type of data detected. In the embodiment shown, elements of the code stream are passed to an operator map array 504, an operator array 506, and an operator metadata table 508, analogous to elements 204-208 of FIG. 2.

The operator map array 504 is, in certain embodiments, a character array capable of maintaining a mapping of the data in the code stream 502, to illustrate the various types of data that may be present in that code stream. For example, in certain embodiments, the operator map array contains a plurality of different values, with each value representing a different type of data that can be in each location in the code stream. Example types of data that can be in the code stream include a parameter, a plain operator, and end of block signal, or a branch target. In some embodiments, a particular data element in the code stream can be more than one such type of data (e.g., both an operator and a branch target, or other combination). As such, in a possible embodiment, the operator map array includes a plurality of bits defining each data element, such that each bit represents a different property of that data element. An example set of bits usable in the operator map array 504 is as follows:

0=Parameter
1=Operator
2=End of Block
4=Branch Target

Other values could be used as well, but assuming a binary representation of each data element, each character entry in the operator map array could define a number of different characteristics of that data element. For example, a value of 3 would represent an operator (1) that is the end of a block (2), or a value of 7 could indicate an operator (1) that is the end of a block (2) and also a branch target (4). This also allows the emulator to check the integrity of each character entry in the operator map array 504, since there should typically never be an end of block or branch target that is not also an operator. As the code stream 502 is parsed, each data element is assessed to determine whether that element is a parameter, an operator, an end of block, or a branch target.

The operator array 506 can also be created concurrently with the operator map array 504, and contains listings of one or more contiguous operators (i.e., operators that are not separated by a branch or end of block). The operator metadata array 508 also can be created concurrently with the operator array 506 and operator map array 504, and contains information about each operator, including the operator length (i.e., number of bytes required to represent the operator) and parameters associated with each operator, as well as a byte offset into the code stream where the operator is located.

Other tables or data structures could be used as well to parse the code stream 502. Generally, the division disclosed provides a convenient way to separate the operators from related operands or other arguments used by the operators, to see the types of operators that are placed in sequence, such that efficient replacement sequences of operators in a target instruction set can be selected for inclusion in a target code stream 520.

Once the code stream 502 is parsed during a first pass through the code to be emulated, the target code stream 520 can be generated, either partially using the information in the operator map array 504, operator array 506, and operator metadata table 508, or entirely using those constructs without re-parsing through the code stream. To generate the target code stream, the operator map array 504 is analyzed to locate blocks of operators that are contiguous, meaning that they are not separated by either branch targets or end of block operators (as defined in the operator map array 504). The block of operators can then be compared to one or more entries in a parser table 510. The parser table 510 includes a set of matched combinations of operators, with a first set of operators being defined in the first (non-native) instruction set architecture, and the second set of one or more operators being defined in the second (native to the target computing system) instruction set architecture. In other words, rather than performing a single operator-to-operator translation of the operators in the non-native ISA to equivalent one or more operators in the native ISA, the parser table contains combinations of operators in the non-native ISA that can be combined (when contiguous and not split by a branch target) and equivalent functionality can be performed using one or more operators in the target ISA.

If a match is found in the parser table 510 according to a particular pattern matching algorithm, a handler function 511 will be called to emit code that performs the functions of the matched non-native operators in the target instruction set architecture.

A variety of algorithms can be employed to determine how to find a best fit of operators matched using the parser table 510. In one example embodiment, parser table entries are prioritized by the number of non-native operators replaced using a single entry; in other words, a match in the parser table representing a contiguous set of three non-native operators would be fulfilled before a match representing two contiguous operators, even if one or more of the three operators also forms part of the contiguous set, or "chain" of the three operators. In the example shown in FIG. 6, a second entry in which three non-native operators, labeled "Operator 1"; "Operator 2"; and "Operator 3" would be represented in code stream 520 by two replacement native operators "NativeOp2" and "NativeOp3"; since each of the non-native operators would be located and a match found, there would be no need for operator-by-operator translator 512. In a second example embodiment, parser table entries could be prioritized by a minimum number of native operators required. In such an embodiment, two non-native operators, labeled "Operator 1" and "Operator 2" would be replaced by a single native operator "NativeOp1", and "Operator 3" would be passed to the operator-by-operator translator 512 if found to be part of no other contiguous set of two or more non-native operators. In still other embodiments, the pattern matching can be performed using a weighting scheme in which greater emphasis would be applied to operator combinations in the parser table found to provide a greatest performance improvement in a target instruction set architecture. In other words, various different sets of heuristics can be applied by an emulator to determine a "best" match between streams of non-native operators and translated target operators.

In further embodiments, the level of pattern matching is user selectable, with an ability to select either (1) no pattern matching in the parser table, (2) some level of pattern matching (e.g., locating only groups of two concatenated operators), or (3) full pattern matching within the parser table. This would allow a user to adjust the level of optimization applied to achieve code stream 520 based on an observed computational intensity required by the emulator to perform the pattern matching algorithm on a particular machine and a particular non-native code stream. Other pattern-matching algorithms can be applied as well.

If no match for a combination of non-native operators in the code stream 502 is found, or if some operators remain unmatched, the unmatched operators are translated using a traditional operator-by-operator translator 512, such that each operator in the non-native code stream 502 is translated for execution on the target computing system. The translated operators, both from the parser table 510 and the operator-by-operator translator 512, are combined with other operator information to form code stream 520, for execution natively on the target computing system.

It is noted that, in some embodiments, single non-native operators can be included in the parser table as well. For example, one or more individual operators may have special handling requirements for which an emulator may wish to call a particular handler function. Additionally, use of handler functions triggered by a "hit" in the parser table, for both single and concatenated operators, allows the emulator to instantiate one or more integrity checks for the generated target code stream 520.

Figure 6:
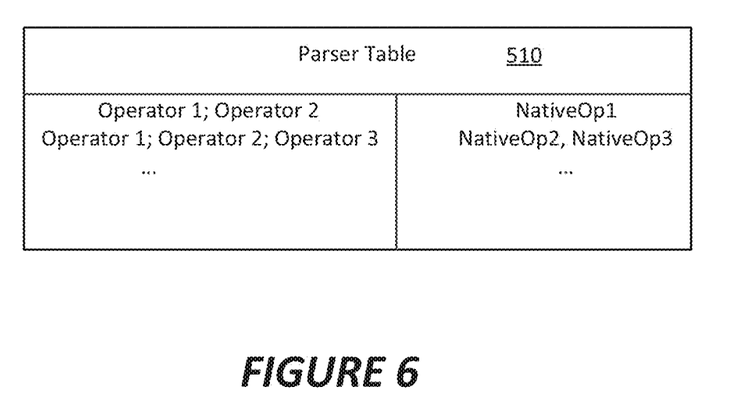
FIG. 6 is a schematic example of a parser table usable in the context of the present disclosure.

Additionally, and using the overall process as illustrated in FIGS. 5-6, it is recognized that the emulation/translation process by which a non-native code stream 502 is translated into a natively-executable code stream 520 may vary in different execution instances. For example, in certain embodiments, the parser table 510 can be loaded at the time an emulator is instantiated, and will be used at the time the code stream 502 is to be executed. Additionally, at different times the first code stream 502 is executed, different algorithms for pattern matching may be used. Therefore, each time the code stream 502 is executed, different contents in the parser table 510 or different methods of selecting those contents may dictate a different set of native operators in the code stream 520, and consequently different performance on a target computing system.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method of executing a code stream of non-native binary code on a computing system, the method comprising:
   parsing a code stream to detect a plurality of elements including one or more branch destinations;
   traversing the code stream to detect a plurality of non-native operators;
   executing a pattern matching algorithm against the plurality of non-native operators to find combinations of two or more non-native operators that do not span across a detected branch destination and that correspond to one or more target operators executable by the computing system; and generating a second code stream executable on the computing system including the one or more target operators.

2. The method of claim 1, further comprising executing the second code stream on the computing system.

3. The method of claim 2, wherein executing the second code stream occurs at least partially concurrently with generating the code stream.

4. The method of claim 1, wherein parsing the code stream to detect one or more branch destinations comprises generating a plurality of arrays of information describing the code stream, the plurality of arrays including a map array, an operator array, and an operator metadata array.

5. The method of claim 4, wherein the map array includes an array of values representing types of data represented by the code stream.

6. The method of claim 5, wherein the types of data include a type selected from the group consisting of:
a parameter;
an operator;
an end of block operator; and
a branch target.

7. The method of claim 4, wherein the operator array includes a sequence of two or more contiguous non-native operators.

8. The method of claim 7, wherein the operator metadata array includes information associated with each of the non-native operators.

9. The method of claim 1, wherein executing the pattern matching algorithm includes checking a sequence of two or more contiguous non-native operators against a parser table containing one or more corresponding target operators.

10. The method of claim 9, further comprising, upon failing to determine that an operator falls within at least one sequence of two or more contiguous non-native operators in the parser table, outputting a target operator corresponding to that operator.

11. The method of claim 1, wherein executing the pattern matching algorithm occurs in response to selection of an option within an emulator.

12. A computing system comprising:
a memory;
a processing unit operatively connected to the memory unit, the processing unit configured to execute program instructions defined by a first instruction set architecture; and
an emulation module stored in the memory and executable on the processing unit, the emulation module including instructions for executing a code stream on the processing unit, the code stream defined by a second instruction set architecture incompatible with the first instruction set architecture, the emulation module comprising:
a parser module configured to parse the code stream to detect a plurality of elements including one or more branch destinations and a plurality of non-native operators; and
a pattern matching module configured to find combinations of two or more non-native operators that do not span across a detected branch destination and that correspond to one or more target operators executable by the computing system;
wherein the emulation module is configured to generate a second code stream executable on the computing system including the one or more target operators.

13. The computing system of claim 12, wherein the parser module is configured to generate a plurality of arrays of information describing the code stream, the plurality of arrays including a map array, an operator array, and an operator metadata array.

14. The computing system of claim 13, wherein the map array includes an array of values representing types of data represented by the plurality of elements identified in the code stream.

15. The computing system of claim 12, wherein the operator array includes a sequence of two or more contiguous non-native operators.

16. The computing system of claim 12, wherein the operator metadata array includes information associated with each of the non-native operators.

17. The computing system of claim 12, further comprising a parser table defining a correspondence between two or more non-native operators and one or more target operators.

18. The computing system of claim 12, wherein the parser module is configured to parse the code stream using a plurality of passes through the code stream.

19. The computing system of claim 18, wherein in a first pass of the plurality of passes through the code stream the parser module is configured to detect the one or more branch destinations, and wherein in a second pass of the plurality of passes through the code stream the parser module is configured to detect the plurality of non-native operations.

20. A computer-readable storage medium comprising computer-executable instructions stored thereon and which, when executed on a computing system, cause the computing system to execute a method of executing a code stream of non-native binary code, the method comprising:
parsing the code stream to detect a plurality of elements including one or more branch destinations and a plurality of non-native operators,
generating a plurality of arrays of information describing the code stream, the plurality of arrays including a map array, an operator array, and an operator metadata array,
executing a pattern matching algorithm against the plurality of non-native operators to find combinations of two or more contiguous non-native operators that do not span across a detected branch destination in the code stream and that correspond in a parser table to one or more target operators executable by the computing system, thereby avoiding translation of the combinations of operators on an operator-by-operator basis; and
generating a second code stream executable on the computing system including the one or more target operators.

* * * * *